March 7, 1950 R. B. EYERLY 2,499,476
CONNECTOR FOR IRRIGATION PIPES
Filed Dec. 26, 1947

INVENTOR:
RUSSELL B. EYERLY
BY
ATTORNEY

Patented Mar. 7, 1950

2,499,476

UNITED STATES PATENT OFFICE 2,499,476

CONNECTOR FOR IRRIGATION PIPES

Russell B. Eyerly, Salem, Oreg.

Application December 26, 1947, Serial No. 793,864

3 Claims. (Cl. 285—172)

1

This invention relates generally to irrigation and particularly to a connector for irrigation pipes.

The main object of this invention is to provide a simple and efficient form of connector, whereby two pipes may be flexibly joined in a manner that the pipes cannot slide with relation to each other after the joint is completed.

The second object is to provide a connector which will be easy to apply and simple to lock in place without the use of tools of any kind, once the connector is mounted on the pipe portions.

I accomplish these and other objects in the manner set forth in the following specification as illustrated in the accompanying drawing, in which.

Like numbers of reference refer to the same or similar parts throughout the several views.

Figure 3:
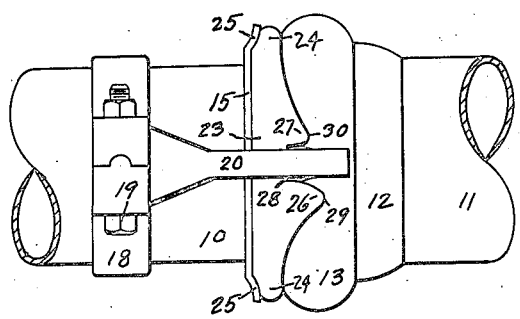
Fig. 3 is a plan of Fig. 1.
Figure 4:
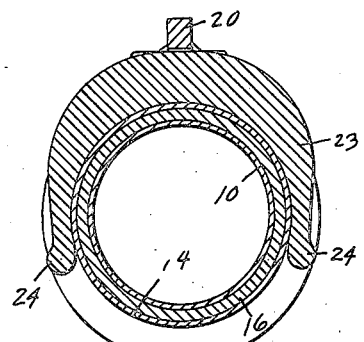
Fig. 4 is a section taken along the line 4—4 in Fig. 1.
Figure 1:
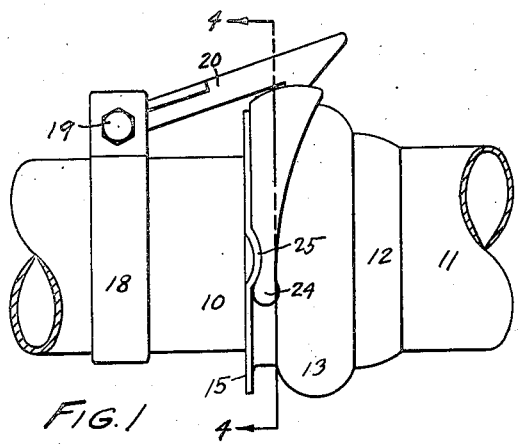
Fig. 1 is a side elevation of the device, showing it holding two pipe sections together.
Figure 2:
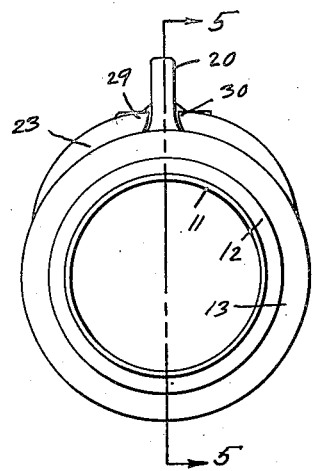
Fig. 2 is an end elevation of Fig. 1.
Figure 5:
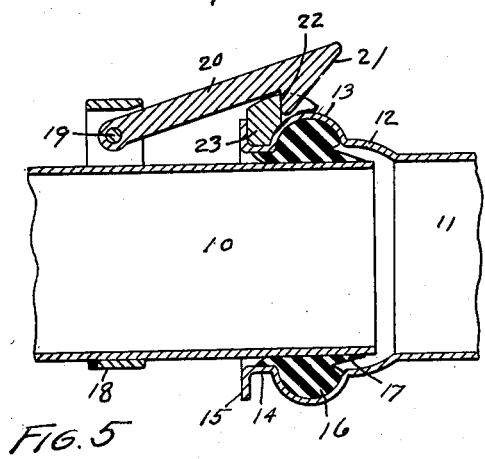
Fig. 5 is a section taken along the line 5—5 in Fig. 2.

Referring in detail to the drawing, there is shown a pipe end 10 which is to be connected to the end 11 of an adjacent pipe having the outwardly curved bell end 12 which merges into the rounded bell 13 which in turn is integral with the cylindrical portion 14 having the out-turned flange 15, the interior of which is somewhat larger than the outer diameter of the pipe 10. A rubber packing ring 16 is placed between the pipe 10 and the bell portion 13 and its thin edge 17 seals against the pipe 10 under pressure exerted by the water in the pipes 10 and 11. This portion of the device is now in common use.

Referring more particularly to my invention, same will be seen to include a band clamp 18, on whose bolt 19 is hinged a latch arm 20 having the inclined face 21 and a slightly undercut latching shoulder 22.

Disposed around the cylindrical portion 14 of the member 11 is a semi-circular clip 23, preferably of a ductile material such as bronze, and having the ends 24 cut away to receive the bent flange portions 25 which confine the ends 24 between the members 13, 14 and 15. The member 23 is provided with a pair of fins 26 and 27, between which is formed a latching notch 28, adapted to receive the latching shoulder 22 of the latch arm 20. It will be noted that the point 29 extends beyond the point 30, the purpose being to permit the ready finding of the notch 28. In other words, to assemble the device it is only necessary to push the pipe 10 into the packing ring 16 far enough for the latch 22 to ride upon

2 the fin 27 and fall into the notch 28, when the members 10 and 11 are turned with relation to each other.

Obviously, to separate the pipes 10 and 11, it is only necessary to manually raise the latch arm 20 and permit the separation of the members 10 and 11.

I claim:

1. A device of the class described, consisting of a semi-circular clip of ductile material adapted to be secured to the flanged end of an irrigation pipe, a rubber gasket mounted in the flanged end of said pipe, a second irrigation pipe occupying said rubber gasket, a latch hinged to said second pipe, adapted to engage said U-shaped clip, said latch having an inclined face adapted to engage said semi-circular clip and to be raised thereby when said irrigation pipes are assembled, said clip having a notch therein, one side of which is longer than the other, a clamp attached to the innermost pipe and a latching arm hinged to said clamp, adapted to engage the notch in said clip.

2. In a connector for irrigation pipes, a semi-circular clip adapted to occupy a portion of the groove around the bell-end of an irrigation pipe, means for retaining said clip in said groove, said clip having the edge farther from the bell-end provided with a notch and having one side of the notch longer than the other side, the shorter side of the notch being joined by an inclined surface to the groove engaging portion of the clip.

3. In a connector for irrigation pipes, a semi-circular clip having one radial edge and having the middle of the clip curved away from said radial edge, said curved portion having a notch formed therein on the edge opposite its radial edge, one side of said notch being longer than the other side thereof, the shorter side of said notch having an inclined approach connecting with one of the clip ends and the longer of said notch sides merging with the opposite end of said clip, said clip being characterized by having the radial edge notched at the ends to receive bent portions of a flange on the bell-end of an irrigation pipe while said clip occupies the groove on said bell-end.

RUSSELL B. EYERLY.

REFERENCES CITED

The following references are of record in the file of this patent:

UNITED STATES PATENTS

| Number | Name | Date |
|---|---|---|
| 729,479 | Wittman | May 26, 1903 |
| 2,253,232 | Gheen | Aug. 19, 1941 |
| 2,277,990 | Lanninger | Mar. 31, 1942 |
| 2,449,735 | Wyss | Sept. 21, 1948 |